Sept. 23, 1969     B. J. FOSTER     3,467,987

EXTRUDER-PELLETIZER APPARATUS

Filed July 26, 1967     2 Sheets-Sheet 1

INVENTOR.
B. J. FOSTER

BY *Young & Quigg*

ATTORNEYS

United States Patent Office 3,467,987
Patented Sept. 23, 1969

3,467,987
EXTRUDER-PELLETIZER APPARATUS
Billy J. Foster, Pasadena, Tex., assignor to Phillips
Petroleum Company, a corporation of Delaware
Filed July 26, 1967, Ser. No. 656,127
Int. Cl. B29f 3/01
U.S. Cl. 18—12                    6 Claims

ABSTRACT OF THE DISCLOSURE

A device for an extruder-pelletizer for controlling the clearance between the cutting means and the extrusion die face so that the cutting means will not contact the die face which permits this clearance to be adjusted without removal of the cutting head.

This invention relates to plastic processing equipment. In another aspect this invention relates to apparatus for use in extruder-pelletizing equipment.

Plastic pelletizing equipment commonly utilizes rotating blades or other cutting means located adjacent to an extrusion die face to cut strand-like plastic being extruded through a plurality of orifices in the die to the desired pellet lengths. To obtain the desired cleaving of the still warm plastic, a close tolerance is maintained between the cutting edge of the rotating blades and the extruder die face. If the cutting edges are too far away from the die face, the cutting action is such that the plastic is smeared onto the die face and this plastic tends to build up thereon requiring frequent shutdowns to remove the build-up. On the other hand, if the cutting edges are so close that they contact the die face, the die face and/or cutting edges can be damaged to the extent that replacements are required, e.g. the cutting edges which are rotating at relatively high speeds, such as 4,000 r.p.m. or higher, "burn" the die face. As the cutting edges wear or are sharpened the dimensions are altered sufficiently so that an adjustment is necessary to maintain the desired clearance between the cutting edges and the die face. This adjustment is usually made by removing the cutting head and making adjustments to the blade mountings. Even when extreme care is exercised while making this adjustment, quite frequently the cutting edges either contact the die face with resultant damage or the clearance is so large that the aforementioned build-up occurs.

I have provided a device which provides a positive means for controlling the cutting edge-to-die face clearance so that a minimum clearance can be maintained without the danger of the cutting edges contacting the die face and provides the capability for adjusting this clearance without removing the cutting head, thus solving the problems and eliminating the inconveniences heretofore encountered by the processor using this type of pelletizing equipment.

Accordingly, an object of this invention is to provide apparatus adaptable to pelletizing equipment for controlling the cutting means-to-die face clearance.

Another object of this invention is to provide apparatus of the aforementioned type which allows adjustment of the cutting means-to-die face clearance without removal of the cutting head.

A further object of this invention is to provide apparatus of the aforementioned type which permits maintaining a close tolerance between the cutting means and the die face while insuring that the cutting means will not contact the die face.

Other objects, aspects, and advantages of this invention will become apparent to those skilled in the art from the following detailed description, drawing, and appended claims.

According to this invention, a device is provided for controlling the clearance between the cutting edges and the die face of an extruder-pelletizer so that the cutting means will not contact the die face. The device includes a sleeve mounted in the cutting head carrying the cutting means, such as knife blades, and an adjustment means adjustably mounted in the sleeve which contacts the die face as the cutting head is moved into position adjacent to the die face for operation. The adjusting means, which act as a stand-off, is provided with means for moving same laterally with respect to the sleeve and cutting head so that the clearance may be adjusted without removing the cutting head. A locking means is included so that after the desired clearance has been preset with the adjustment means it will not move laterally during operation of the cutting head.

Reference is made to the drawings for a detailed description of this invention wherein.

Figure 1:
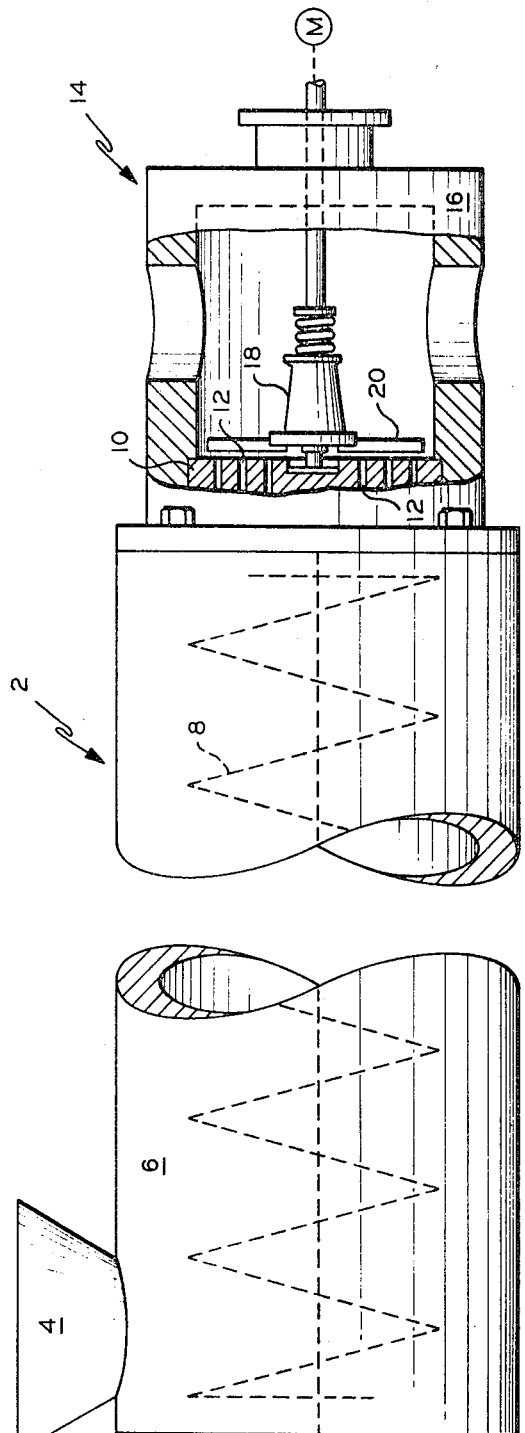
FIGURE 1 is a somewhat diagrammatic representation, partially sectioned, of an extruder-pelletizer showing the relationship of the cutting edges to the die face.

FIGURE 1 shows a conventional underwater extruder-pelletizer. Extruder-pelletizer 2 includes a supply hopper 4, an extrusion barrel 6 having a motorized screw 8 rotatably mounted therein, a die head 10 containing a plurality of orifices 12 attached to extrusion barrel 6, and a cutting or pelletizing mechanism 14 comprising body 16 with a motorized cutting head 18 holding one or more cutting edges, such as knife blades 20, rotatably mounted in body 16, attached to extrusion barrel 6 adjacent to die head 10. It will be understood that the extrusion-pelletizer 2 is provided with the usual heating mechanism for warming feed material introduced through hopper 4 to more plastic and workable conditions so that same may be extruded through orifices 12 in strand-like form. Extruder-pelletizer 2 is also provided with the usual mounting devices (not shown) and is usually submerged in water during operation.

Figure 2:
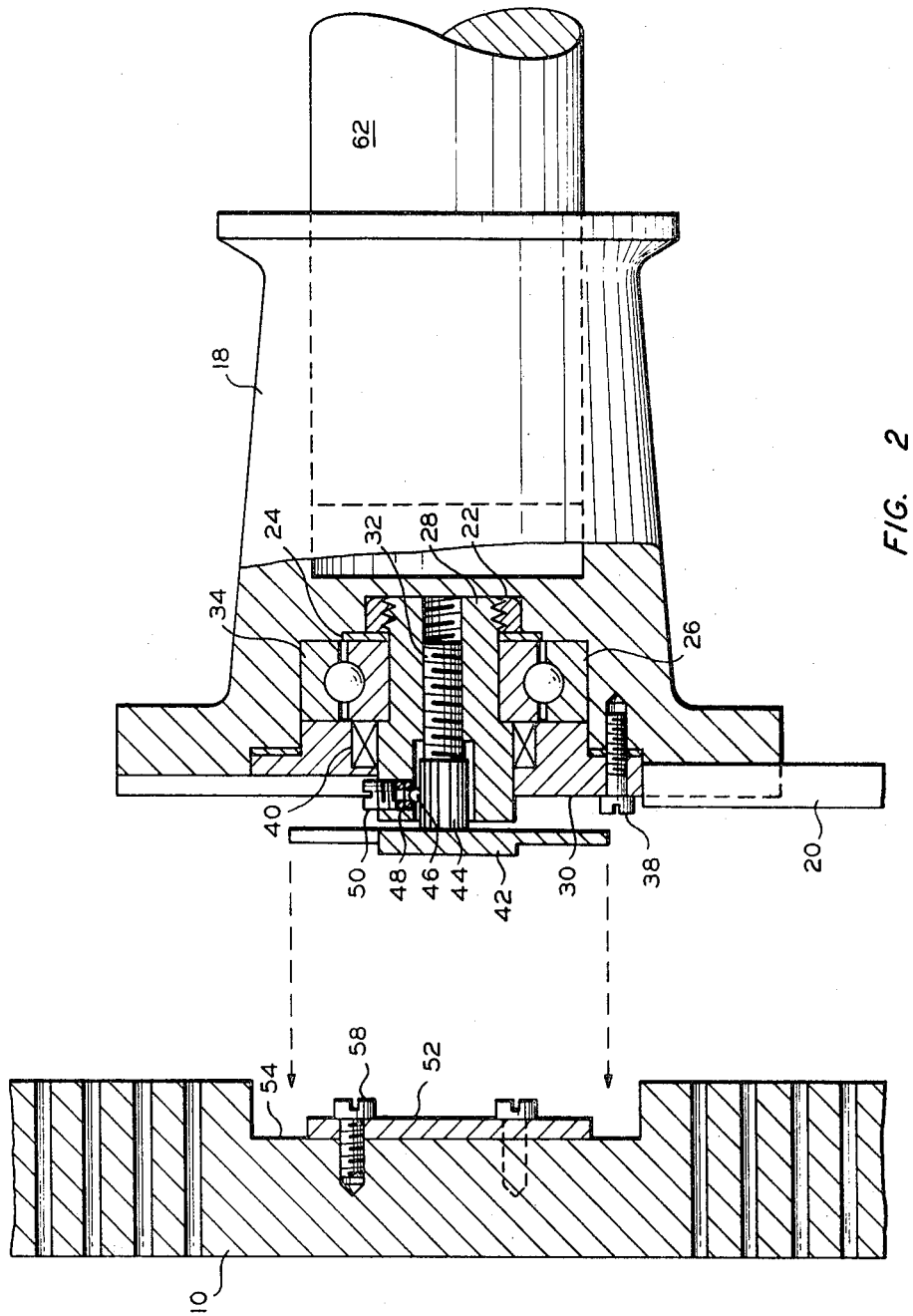
FIGURE 2 is a partially sectioned, exploded view of a cutting head and an extrusion die of an extruder-pelletizer with the apparatus of this invention installed.

As shown in FIGURE 2, an assembly comprising lock nut 22, lock washer 24, bearing 26, sleeve 28, retainer 30, and adjusting screw 32 is mounted in recess 34 of cutting head 18 and attached to cutting head 18 by a plurality of bolts 38 (one shown). Bearing 26 is held in position on sleeve 28 by lock washer 24, and lock nut 22 so that cutting head 18 can rotate relative to sleeve 28 which is maintained stationary as described hereinafter. Retainer 30, which rotates with cutting head 18, includes bearing 40 which rides on the surface of sleeve 28. Adjustment screw 32, which is threaded into sleeve 28, has a slotted head 42 and a spline 44 adjacent to head 42. Sleeve 28 includes a clicking lock mechanism comprising ball 46, spring 48, and set screw 50. Ball 46 is urged into the grooves of spline 44 by spring 48. The spline grooves are equally spaced around the diameter of the adjustment screw shaft so that each "click," as the adjustment screw head 42 is rotated one way or the other and ball 46 is urged into the spline grooves, is equal to a known lateral motion of the adjustment screw. This lateral movement depends on the diameter of the spline section, the number of spline grooves, and the number of threads per inch in the threaded portion of the adjustment screw. Set screw 50 is tightened to lock the adjustment screw in place after the desired adjustment has been made.

Plate 52, mounted in recess 54 of die head 10 with bolts 58, acts as a pad against which adjustment screw head 42 is moved when the cutting head 18 is moved into position adjacent to the die head for operation. The slots of the adjustment screw head (not shown) are arranged so that they align with bolts 58 which hold plate 52 onto die head 10. The bolt heads fitting into the slots keep the adjustment screw from turning during operation of the cutting head. Plate 52 can also include any other type of protrusion over with the slots in adjustment screw head 42 can fit to obtain this stationary position of the adjustment screw.

Adjustment screw 32 and plate 52 are dimensioned such that even when the adjustment screw is threaded into sleeve 28 as far as possible a minimum clearance exists between die head 10 and cutting blade 20, mounted on cutting head 18, when cutting head 18 is moved into position for operation. The clearance between die head 10 and cutting blade 20 is adjusted by moving cutting head 18 away from die head 10, loosening set screw 50, adjusting adjustment screw 32, the number of "clicks" corresponding to the desired lateral movement of the cutting blade 20 toward or away from the die head, tightening set screw 50 to lock adjustment screw 32 in place, moving the cutting head 18 into position while aligning the slots on adjustment screw head 42 with bolts 58 holding plate 52 on die head 10, pushing adjustment screw head (slotted head) 42 against plate 52 and locking the cutting head shaft 62 in position with the usual locking mechanism included in an extruder-pelletizer to prevent later movement of the cutting head during operation.

The device of this invention permits the adjustment of the cutting means-to-die head clearance without removing the cutting head thereby providing a substantial time savings for making the adjustment. A device similar to that shown and described in connection with FIGURE 2 has been incorporated into a production underwater extruder-pelletizer and the previous one-hour time required to make the adjustment was reduced to less than 5 minutes. Since these adjustments are made quite frequently, the time savings effected by this invention permits a significant cost reduction. Removal of the cutting head also presents a relatively serious safety hazard because of the necessary handling of the cutting blades. This invention, by providing the capability of adjusting the clearance without removal of the cutting head, substantially eliminates such a safety hazard. An added advantage of this invention is that the cutting head adjustment can be made when evidence of any polymer build-up on the die face resulting from improper clearance first occurs. The reduced time and labor required to make the adjustment with this invention permits the processor to make the adjustment frequently without suffering the consequences of machine downtime. By being able to make frequent adjustments the polymer build-up is reduced significantly. For example, prior to installation of this invention an extruder-pelletizer producing polyethylene pellets had to be shut down every eight hours to remove polymer build-up on the die face. After this invention was installed, the pelletizer was operated for three weeks before a shutdown for cleaning was required.

As will be evident to those skilled in the art, various modifications and alterations can be made to this invention in view of the foregoing disclosure without departing from the spirit or scope thereof.

I claim:

1. In an extruder-pelletizer having a cutting head holding cutting means which passes in close proximity to the face of an extrusion die and cuts plastic material being extruded through the die, a device for controlling the clearance between the cutting surface of the cutting means and the die face comprising, in combination:

(a) a sleeve mounted in said cutting head;
(b) adjustment means adjustably mounted in said sleeve arranged to be in contact with said die face when said cutting head is in position for operation so that lateral movement of said adjusting means relative to said sleeve changes the amount of clearance between said cutting means and said die face, the minimum clearance being sufficient so that said cutting means do not contact said die face; and
(c) locking means carried by said sleeve for locking said adjusting means in position to prevent lateral movement thereof.

2. The device according to claim 1 wherein said adjusting means comprises an adjustment screw having a shaft, one end of said shaft being threaded into said sleeve so that rotation of said shaft causes lateral movement of same relative to said sleeve and the other end of said shaft having a head which contacts said die face when said cutting head is moved into position for operation.

3. The device according to claim 2 wherein said locking means comprises a spline carried by said shaft and a spring-loaded detent carried by said sleeve arranged for engagement with one of the grooves of said spline on said adjustment screw.

4. The device according to claim 3 further comprising a means for maintaining said adjustment screw stationary while said cutting head is operating.

5. The device according to claim 4 wherein said means for maintaining said adjusting screw stationary comprises said die face having a recess; a plate having protrusions mounted in said recess of said die face; said head having slots which are arranged to be aligned with said protrusions as said cutting head is moved into position for operation; and said sleeve rotatably mounted to said cutting head.

6. In an extruder-pelletizer having a cutting head carrying knife blades which pass in close proximity to the face in an extrusion die and cut plastic material being extruded through the die, a device for controlling the clearance between the knife blades and the die face comprising, in combination:

(a) a sleeve rotatably mounted in said cutting head;
(b) said die face having a recess;
(c) a plate having protrusions mounted in said recess in said die face;
(d) an adjustment screw having a shaft with a spline at an intermediate point, one end of said shaft being threaded into said sleeve so that rotation of said shaft causes lateral movement of same relative to said sleeve and the other end of said shaft having a head with slots therein, said head being arranged so that it contacts said plate and said slots can be aligned with said protrusions when said cutting head is moved into position adjacent to said die face for operation; and
(e) a spring-loaded detent carried by said sleeve arranged for engagement with one of the grooves of said spline.

References Cited

UNITED STATES PATENTS

| 3,143,766 | 8/1964 | Rohn | 18—12 |
| 3,196,487 | 7/1965 | Snelling | 18—12 |
| 3,266,090 | 8/1966 | Gosnry | 18—12 |
| 3,337,913 | 8/1967 | List | 18—12 |

WILLIAM J. STEPHENSON, Primary Examiner